April 23, 1963 C. H. MOTZ 3,086,294
AUTOMATIC GEAR CHECKER FOR INTERNAL GEARS
Filed April 27, 1959
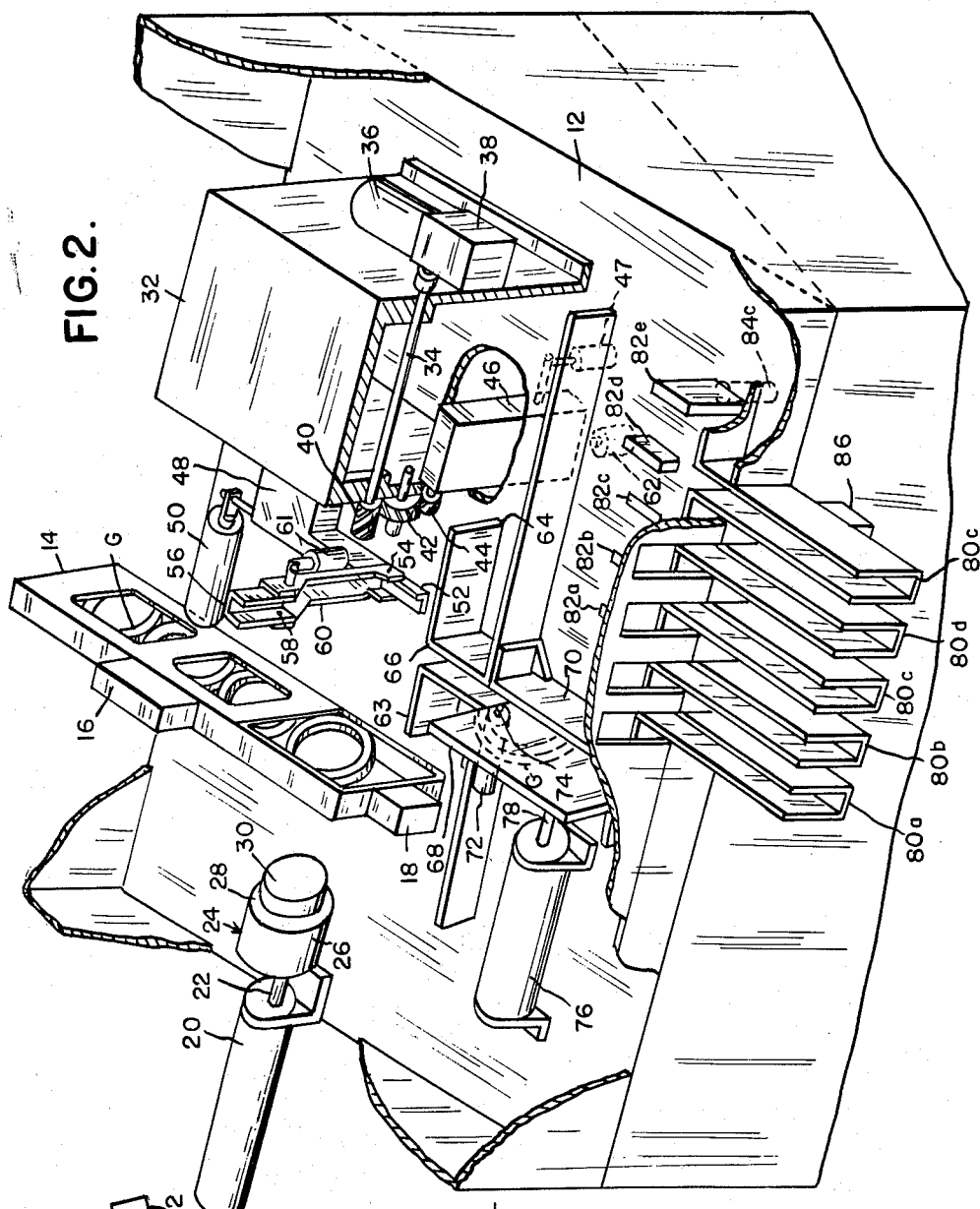
INVENTOR.
CARL H. MOTZ
BY
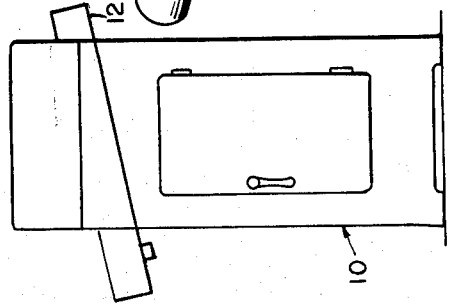
ATTORNEYS

United States Patent Office 3,086,294
Patented Apr. 23, 1963

3,086,294
AUTOMATIC GEAR CHECKER FOR
INTERNAL GEARS
Carl Henry Motz, East Detroit, Mich., assignor to National Broach & Machine Company, Detroit, Mich., a corporation of Michigan
Filed Apr. 27, 1959, Ser. No. 808,995
6 Claims. (Cl. 33—179.5)

The present invention relates to an automatic gear checker for internal gears.

It is an object of the present invention to provide automatic mechanism for checking size and/or eccentricity of internal gears and for separating the gears into groups according to the results of the check.

More specifically, it is an object of the present invention to provide automatic gear checking mechanism for checking a series of identical internal gears including means for preventing scuffing between the work gears and a master gear.

It is a further object of the present invention to provide gear checking apparatus comprising an inclined support, a master gear on the support transfer means for moving a work gear from a loading chute into mesh with the master gear, means for removing the checked work gears from the master gear and for releasing the gear to permit it to roll by gravity to a separating station.

Other objects and features of the invention will become apparent as the description proceeds, especially when taken in conjunction with the accompanying drawings, illustrating a preferred embodiment of the invention, wherein:

FIGURE 1 is a side elevational view of the apparatus.

FIGURE 2 is an enlarged perspective view with parts broken away.

As best seen in FIGURE 1, the gear checker comprises a support structure or cabinet 10 including an inclined platform 12 on which the mechanism about to be described is primarily mounted.

Referring now to FIGURE 2 there is provided a loading chute 14 through which a plurality of internal work gears G advance by gravity. A trigger device 16 is provided in the chute and is adapted to release one gear at a time for movement to the lower end of the chute where the gear engages a signal switch 18 to initiate the succeeding step in the operation.

Mounted on the platform 12 is an air cylinder 20 having a piston therein connected to a piston rod 22 which at its outer end carries the work transfer device indicated generally at 24. This device comprises a cylindrical body 26 having an annular front face 28 and a retractable plug 30 adapted to enter into the opening in an internal gear with substantial clearance relative thereto. The plug 30 is yieldable when it engages the end of the master gears which support a work gear in checking position. When the transfer device moves forwardly the plug 30 enters the opening in a work gear G and the adjacent side of the work gear engages the annular surface 28 so that the internal gear is advanced in adequately supported relation toward the checking structure which will now be described.

Carried on the platform 12 is upstanding housing structure 32 in which is mounted a shaft 34 connected to suitable drive means such for example as a drive motor 36 and gear box 38. At an end of the shaft 34 exterior of the housing 32 is an elongated master pinion 40 which is conjugate to the internal gears G which are to be checked. An idler gear 42 is provided on a wall of the housing 32 in mesh with the master gear 40 and a movable master gear 44 is provided on a discriminator slide 46 which extends into the lower part of the cabinet and is there associated with an accurate measuring instrument indicated diagrammatically at 47, details of which form no part of the present invention. It may be noted, however, that the measuring instrument is adapted to measure vertical movement of the discriminator slide 46 and is therefore effective to determine size of the work gear and may also, by measuring vertical movement of the discriminator slide 46 during a half revolution of a work gear, determine eccentricity thereof.

Associated with the master gears 40 and 44 and the intermediate idler gear 42 is a work unloader slide 48 movable horizontally on the platform 12 and connected to suitable power means such for example as a piston and cylinder device more or less diagrammatically indicated at 50 adapted to move the slide longitudinally. The slide 48 in FIGURE 2 is illustrated in the work unloading position for clarity. When the transfer device 24 moves a gear into position to mesh with the master gears 40 and 44, the work unloader slide 48 is to the right. Mounted on the work unloader slide 48 is an anti-scuff plate 52 which is pivoted as indicated at 54. Also associated with the work unloader slide 48 is a work retainer 56 pivoted as indicated at 58 to an upstanding channel-shaped arm 60 mounted on the unloader slide. The anti-scuff plate 52 is movable from a position in which it extends downwardly from its pivot mounting 54 to a position in which it extends generally parallel to the plane of the platform 12, and in the latter position it is adapted to support a work gear G in a position above the plane of full mesh with the master gear 40. The purpose of this arrangement is to support the gear in a position in which its teeth enter into tooth spaces of the master gear 40 but in which rubbing between the teeth of the work gears and master gear is effectively prevented.

The work retainer 56 is adapted to swing downwardly from the illustrated position to engage over the top of a work gear when it is in mesh with the master gear 40 and to retain the gear in checking position as the transfer device 24 is withdrawn to the left to the position illustrated in FIGURE 2. The work retainer 56 has the additional function of cooperating with the anti-scuff plate 52 to support a work gear after it has been checked and as it is moved to the left from a position of mesh with the master gears 40 and 44 into a position from which it rolls to the separating machine subsequently to be described.

Suitable motor means such for example as a solenoid or air cylinder diagrammatically indicated at 61 are provided for effecting movement of the anti-scuff plate 52 and work retainer 56 in the properly timed relationship.

The discriminator slide 46 includes means such for example as a push rod connected to an air cylinder 62 adapted to move the discriminator slide and hence the lower master gear 44 upwardly during movement of a work gear G to checking position. The master gear 44 is dimensioned such that when in tight mesh with the intermediate or idler gear 42, it is in substantial clearance with respect to a work gear supported on the upper master gear 40, although this clearance is limited to an amount such that teeth of the master gear 44 enter into tooth spaces of the work gear to retain it in an accurately located position.

Mounted on the platform 12 is stationary chute structure comprising plates 63 and 64 adapted to define a passage 66 into which a work gear G may roll when released by the work retainer 56. Slidably mounted on the platform 12 is a separator carrier comprising spaced plates 68 and 70 separated to provide a space therebetween into which a work gear G rolls. Mounted on the plate 68 is an air cylinder 72 having a piston therein connected to a retainer pin 74 which is adapted to be advanced to enter into the space of a gear G. Mounted on the platform 12 is an air cylinder 76 having a piston therein connected to a piston rod 78 which connects to the plate 68 of the separator carrier.

At the lower side of the platform 12 there are provided a plurality of discharge chutes indicated at 80a, 80b, 80c, 80d and 80e, which may separate the gears into a plurality of categories such for example as oversize, undersize, and three classifications of acceptable gears separated as to sizes.

The mechanism for separating the gears comprises a plurality of vertically movable abutment slides 82a, 82b, 82c, 82d, and 82e which are actuated to the upper position by suitable means responsive to movement of the discriminator slide 46, as is well understood in the art. The mechanism for raising and lowering the abutment slides 82a through 82e may be in the form of solenoids, air cylinders, or the like, one of which is diagrammatically indicated at 84e.

The operating sequence of the mechanism will now be described:

Assume that the parts are in the relative position illustrated in FIGURE 2. At this time a work gear will have just been released from the work unloader 48 by downward movement of the anti-scuff plate 52 and upward movement of the work retainer 56, and this gear will have rolled through the slot 66 into the space between the plates 68 and 70. When it reaches the position illustrated between these plates it operates a signal switch (not shown) which advances the retainer pin 74 and which also supplies fluid to the cylinder 76 to move the separator carrier to the right. When the gear located in the separator carrier was supported between the master gears 40 and 44, it was checked for size and/or eccentricity. In the present instance it may be assumed that the slides or chutes 80b, 80c and 80d are adapted to receive different sizes of acceptable gears. As illustrated in the figure, the abutment slide 82d has been raised by operation of the checking or measuring apparatus and is in position to be engaged by the plate 70 to limit forward movement of the separator carrier in a position such that the work gear G carried thereby will roll down the chute 80d. When movement of the separator carrier is arrested by engagement with one of the abutment slides 82a through 82e, a switch (not shown) is provided which may be operated by engagement with one of the abutment slides and is effective to control the cylinder 72 to retract the retainer pin 74, thus permitting the gear to roll down into the appropriate chute.

Each of the chutes is provided with a suitable signal switch such as indicated diagrammatically at 86 which when energized serves to signal for reversal of the separator carrier which then returns to the position illustrated in the figure.

The switch which signals arrival of a work gear in the separator carrier to advance the retainer pin 74 may also be connected to control movement of the work unloader slide 48 to the right in which it is in substantial alignment with the inner end of the upper master gear 40 and with the lower master gear 44. At this time a new work gear to be checked will be in the loading chute 14 and will engage the switch 18 to initiate forward movement of the transfer device 24. The retractable plug 30 enters the work gear and when the annular surface 28 of the transfer device engages the side of the work gear it is carried forward to a position in which it enters into mesh with the ends of the teeth of the upper master gear 40. At this time the discriminator slide 46 is in its upper position affording clearance or a loose mesh condition to receive the work gear. As the work gear enters into mesh with the ends of the teeth of the elongated upper master gear 40, the anti-scuff plate 52 is moved upwardly to engage the lower surface of the work gear and to support its weight as it is moved forwardly over the teeth of the upper master gear. This prevents scuffing of the teeth of the master gear as will be readily apparent. When the work gear is in fully advanced position in mesh both with the upper master gear 40 and the lower master gear 44, the work retainer 56 swings downwardly to engage over the top of the work gear. At the same time the transfer device 24 is returned, the work gear being retained in checking position by virtue of the work retainer 56. Thereafter, the work retainer 56 is elevated and the anti-scuff plate 52 moves downwardly to release the work gear which at this time is suspended on the elongated upper master gear 40 with the teeth at the lower side thereof in loose mesh with the teeth of the lower movable master gear 44.

The discriminator slide 46 is released to permit the lower master gear 44 to move into full and tight meshed relationship with the teeth at the lower side of the work gear. Obviously, the position to which the discriminator slide 46 moves is an indication of the size of the work gear. Rotation of the work gear by the motor 36 gives a complete check as to size of the work gear throughout its circumferential extent and this same rotation of the work gear may if desired be employed to determine eccentricity or runout of the gear, which of course will appear as vertical movement of the slide 46 during rotation of the work gear.

From the foregoing it will be observed that the gear checker is adapted to operate in a fully automatic manner, the gears being released sequentially by the trigger mechanism for transfer to the checker, and removed by the work unloader from the checker to the separator structure following the checking operation.

It has not been deemed necessary to illustrate the control circuit for the checking apparatus nor the circuits for applying fluid to the separate cylinders since these circuits may be arranged as desired to give the required operating sequence. It is noted however, that the apparatus is rendered fully automatic by a series of control switches adapted to be energized in sequence. Thus for example, the trigger mechanism 16 which releases the lowermost retained gear in the loading chute 14 may be actuated by a switch (not shown) engaged upon movement of the work unloader slide 48 to the right from its illustrated position to the position which it occupies during loading and checking of a gear. Movement of a work gear into engagement with the switch 18 initiates forward movement of the work transfer device 24. The upward movement of the anti-scuff plate 52 may be controlled by arrival of the work transfer device 24 at a position in which the gear carried thereby is in initial mesh with the elongated upper master gear 40. Completion of the loading stroke of the transfer device 24 is used to control downward movement of the work retainer 56 and downward movement of this retainer may initiate return movement of the transfer device 24. Completion of the return stroke of the transfer device 24 may be employed to energize downward movement of the anti-scuff plate 52 to clearance position and upward movement of the work retainer 56 to clearance position as much as releasing the discriminator slide 46 for downward movement. Completion of the checking cycle may conveniently be signaled by predetermined rotation of the drive master gear 48, ordinarily corresponding to 360 degrees' rotation of the work gear G supported thereby, and this in sequence operates the anti-scuff plate 52 and the work retainer 56 to engage the checked gear, and initiates movement to the left of the work unloader slide 48 to the position illustrated in the figure. Arrival of the work unloader slide 48 in the illustrated position releases the work retainer 56 and anti-scuff plate 52 permitting the checked gear to roll into the separator carrier constituted by the plates 68 and 70. Arrival of the work gear in position between these plates actuates a suitable switch which advances the retainer pin 74 and energizes the cylinder 76. In the meantime of course the appropriate one of the abutment slides 82a through 82e has been elevated and will serve to arrest forward movement of the separator carrier in the proper position, which in turn signals for release of the retainer pin 74. The gear then rolls down the appropriate chute actuating a signal switch 86 which returns the separator carrier to its initial position and which may be employed to return the work unloader slide 48 to its operating position. This in turn may again actuate the trigger mechanism 16 to initiate a checking operation on a second gear.

In the foregoing description the anti-scuff plate 52 has been described as pivoted as indicated at 54 to the slide 48. However, the anti-scuff plate may conveniently be mounted to extend from the discriminator slide 46 whose vertical movement is adapted to control the desired movements of the anti-scuff plate. Thus, prior to forward movement of a gear on the transfer device 24, the discriminator slide 46 is moved upwardly, which may position an anti-scuff plate carried thereby so that as the gear to be checked is advanced, it rides up on an inclined lip onto the anti-scuff plate which supports the gear so that it is guided into mesh with the elongated master pinion 40 without having its weight supported from the master gear. After the work gear has been fully seated on the upper master gear 40, the discriminator slide 46 moves downwardly to bring the lower master pinion or gear 44 into tight mesh with the teeth at the lower side of the gear and this movement, imparted to the anti-scuff plate carried by the discriminator, will move the anti-scuff plate into clearance so that it will not engage the work piece as it is rotated during the checking operation. With this arrangement the work retainer 56, engaging over the top of the gear, operates both to shift the gear axially out of mesh with the master gears (the lower master gear having been elevated to facilitate this movement), and also functions to retain the checked work gear from rolling along the inclined platform 12 until it has been brought into alignment with the chute 66 and there released.

The drawing and the foregoing specification constitute a description of the improved automatic gear check for internal gears in such full, clear, concise and exact terms as to enable any person skilled in the art to practice the invention, the scope of which is indicated by the appended claims.

What I claim as my invention is:

1. Apparatus for checking internal gears comprising a fixedly located rotatable master pinion, a movable rotatable master pinion, means mounting said movable master pinion for movement radially of said fixedly located master pinion, a loader comprising a member having an annular abutment surface engageable with the side of an internal gear and a retractable plug within said member shaped to enter loosely into the gear, means for moving said member generally axially of the gear carried thereby and of the master pinions to mesh the work gear and master pinions, and measuring means actuated by movement of said movable master pinion.

2. Apparatus for checking internal gears comprising a fixedly located rotatable master pinion, a movable rotatable master pinion, means mounting said movable master pinion for movement radially of said fixedly located master pinion, a loader comprising a member having an annular abutment surface engageable with the side of an internal gear and a retractable plug within said member shaped to enter loosely into the gear, means for moving said member generally axially of the gear carried thereby and of the master pinions to mesh the work gear and master pinions, said fixedly located master pinion being elongated and projecting toward said loader further than said movable pinion and idler gear whereby the work gear is first meshed with said fixedly located master pinion and is guided thereby during axial movement into mesh with said movable master pinion, and measuring means actuated by movement of said movable master pinion.

3. Apparatus as defined in claim 2 comprising anti-scuff means engageable with a work gear during movement over said fixedly located pinion to support its weight.

4. Apparatus as defined in claim 2 comprising anti-scuff means engageable with a work gear during movement over said fixedly located pinion to support its weight, and means for raising said anti-scuff means after a work gear has entered into initial mesh with said fixedly positioned pinion to raise the work gear into loose mesh therewith.

5. Gear checking apparatus for internal gears comprising a checking head having a fixedly located master pinion and a movable master pinion thereon, said movable master pinion being movable toward the fixedly located master pinion to facilitate movement of a work gear thereover and movable away therefrom into tight mesh with the work gear, a loading chute for receiving a succession of work gears, a loader movable between said chute and head to move a work gear into mesh with said pinions, and movable away from said pinions to leave a work gear on said pinions for checking, and measuring means for measuring gear size as determined by the position of said movable pinion, said loader including an annular member engageable with the side of an internal gear and a retractable central plug shaped to enter into the opening in the internal gear, said plug being retracted by engagement with the pinion on which the work gear is deposited.

6. A gear checker comprising a checking head comprising a pair of master pinions relatively movable toward and away from each other, a supply chute, a loader comprising a member having an annular abutment surface engageable with the side of an internal gear and a retractable plug surrounded by said surface and shaped to enter into the central opening in the gear, means for moving said member past said chute to pick up an annular work gear and to deposit it on said pinions, said plug being retractable as the gear is meshed with said pinions.

References Cited in the file of this patent

UNITED STATES PATENTS

| | | |
|---|---|---|
| 2,346,583 | Jackson | Apr. 11, 1944 |
| 2,356,236 | Gagne | Aug. 22, 1944 |
| 2,540,961 | Osplack | Feb. 6, 1951 |
| 2,785,799 | Esken | Mar. 19, 1957 |
| 2,803,342 | Gates | Aug. 20, 1957 |
| 2,815,579 | Bassoff | Dec. 10, 1957 |
| 2,850,806 | Pomernacki | Sept. 9, 1958 |
| 2,854,760 | Cheever | Oct. 7, 1958 |
| 2,877,895 | Drader | Mar. 12, 1959 |
| 2,905,320 | Gates | Sept. 22, 1959 |
| 2,944,343 | Anthony | July 12, 1960 |